Figure 1:
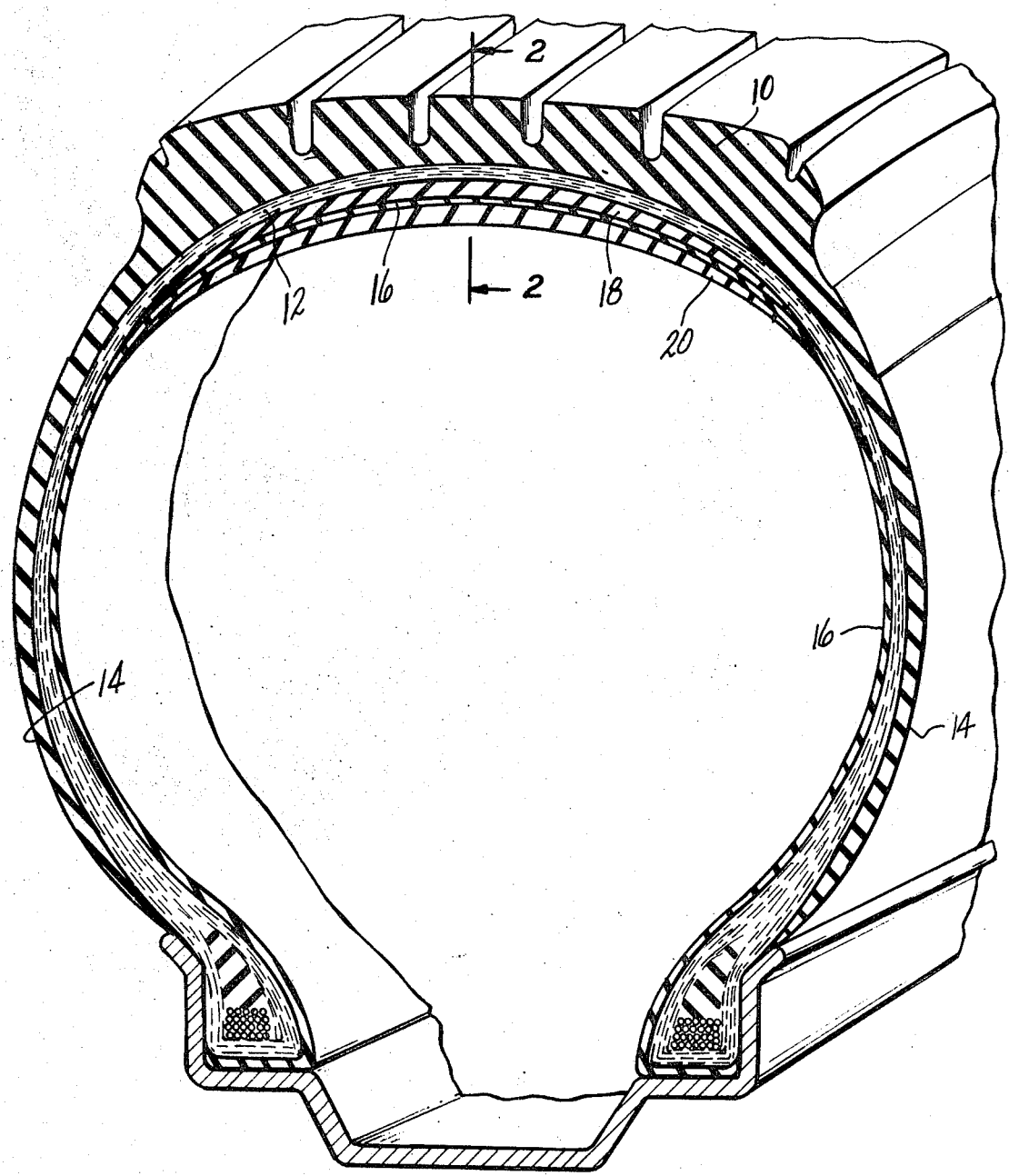

United States Patent

[11] 3,565,151

| [72] | Inventor | John A. Courtney<br>West Haven, Conn. |
|---|---|---|
| [21] | Appl. No. | 768,086 |
| [22] | Filed | Oct. 16, 1968 |
| [45] | Patented | Feb. 23, 1971 |
| [73] | Assignee | The Armstrong Rubber Company<br>West Haven, Conn. |

[54] PUNCTURE-SEALANT TIRE
2 Claims, 2 Drawing Figs.

[52] U.S. Cl. .................................................. 152/347
[51] Int. Cl. .................................................. B60c 5/14
[50] Field of Search ........................................ 152/346,
347, 330; 260/894; 156/115

[56] References Cited
UNITED STATES PATENTS

| 2,587,470 | 2/1952 | Herzegh ........................ | 152/347 |
| 2,675,846 | 4/1954 | Wyman ........................ | 152/347 |
| 2,712,338 | 7/1955 | Hurt ............................. | 152/347 |
| 3,363,659 | 1/1968 | Keckler et al. ................ | 152/330 |

*Primary Examiner*—Arthur L. La Point
*Attorneys*—Steward and Steward, Merrill F. Steward and Donald T. Steward

ABSTRACT: A self-sealing tubeless tire in which a two-ply sealant is employed with the sealant layers separated by the inner liner of the tire.

PATENTED FEB 23 1971

3,565,151

INVENTOR:
JOHN A. COURTNEY

BY Steward + Steward his ATTORNEYS.

PUNCTURE-SEALANT TIRE

This invention relates to means for sealing pneumatic tires against punctures in the crown area of the tire, and it relates more particularly to the application of layers of unvulcanized or partially vulcanized rubber sealant compounds on the inside surface of a tubeless tire so that if an object punctures the tire, the sealant fills the hole formed and prevents loss of air.

The use of puncture sealants in pneumatic tires is well known in the art, but various difficulties have been encountered in providing a suitable self-sealing arrangement. One of the principal difficulties has been the tendency of the sealant to flow or move along the inside surface of the tire, causing it to bunch together and to become too thick in some places and too thin in others. The sealant therefore becomes ineffective against punctures in those areas where the layer of sealant is thin. Furthermore, the sealant sometimes shifts so badly that the tire becomes unbalanced. Another difficulty is that the sealant, which should be tacky and relatively viscous at all times, has over a period of time tended to lose some of its tackiness and viscosity while the tire is in use due to curing of the sealant material by heat generated in the tire as it is driven.

One of the more successful puncture sealing devices employed heretofore is shown in the patent to Sweet et al., U.S. Pat. No. 3,048,509, in which two layers of sealant are separated by a sheet of vulcanized synthetic rubber and both layers sandwiched between two covering sheets of vulcanized synthetic rubber. The sandwich strip of sealant thus formed is placed inside the inner liner of a tubeless tire and formed integrally therewith when the green tire is molded and cured in the press. This prior puncture sealing construction produces good results, but it requires relatively costly materials and increases labor costs either because the strip must be preassembled before it is placed on the tire building drum, or because the man who builds the tire on the drum has several additional operations to perform in assembling the sandwich sealant as he starts the tire building procedure.

The present invention is an improvement in the type of puncture sealant construction disclosed in the above-mentioned Sweet patent in that it significantly reduces the cost of materials and labor required in the manufacture of the tire, while at the same time providing improved sealing performance of tires in which it is employed. The invention resides in the provision of two layers of sealant in the crown area of a tubeless tire and in separating these layers by means of the inner liner which is necessary in all tubeless tires to make the tire impervious to air and which extends from bead to bead inside the carcass plies of the tire. In this way the advantages of a multiple-layer sealant are realized without the need for any covering or separating strips in conjunction with the sealant.

At least three manufacturing operations that are required in building tires in accordance with the Sweet patent are therefore completely eliminated in the manufacture of self-sealing tires of the present invention. In fact, in order to incorporate the puncture sealing means of the present invention, only two more operations are needed than are usually required to build a conventional tubeless tire of the same basic construction, namely the application of one sealing strip before, and one after, the application of the inner liner on the tire building drum. On the other hand, prior multilayer, puncture sealing arrangements have required at least five additional manufacturing operations. Furthermore, severe puncture tests have shown that tires incorporating the sealing means of the present invention provide better sealing against leaks due to punctures than other self-sealing tires on the market today.

Figure 2:
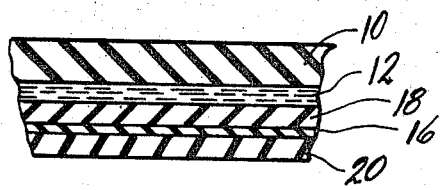

Reference will now be made to the accompanying drawings illustrating one form of the invention, in which:

FIG. 1 is a fragmentary perspective view showing a cross section of a tubeless pneumatic tire embodying the invention; and FIG. 2 is an enlarged fragmentary section taken circumferentially of the tire on the line 2-2 of FIG. 1.

The tire shown in the drawings consists of the usual tread 10, carcass 12 and sidewalls 14, 14. The carcass 12 consists of a plurality of conventional plies of rubber-impregnated cord fabric, and a gas-impermeable, inner liner 16 extends from bead to bead along the entire inner face of the carcass. The invention resides in the use of two layers of sealant 18 and 20 in the crown area of the tire, the layer 18 being located between the carcass 12 and the inner liner 16, while the layer 20 is located on the inside of the inner liner, which therefore separates the two layers of sealant. It is generally recognized in the art that the sealant compositions employed must have a low enough viscosity and tackiness to seal properly and that when using suitable compositions, which maintain a good tacky condition, it is necessary to make the layer of sealant about 1/10 of an inch thick, so that the sealant does not flow due to centrifugal force when the tire is in use. Each of the sealant layers 18 and 20 is therefore desirably 0.120 inch or less.

The sealing composition of the present invention is basically a styrene butadiene (SBR) type of synthetic rubber containing a smaller amount of curatives when that in sealing compositions generally employed heretofore. In addition, a blend of SBR 1500 and SBR 1009 has been found to be very important in order to prevent shrinkage of the sealant strip, which has made it difficult to control the dimensions of the strip during processing. SBR 1500 is a cold polymerized styrene butadiene rubber, while SBR 1009 is a hot polymerized type that has been cross linked with divinyl benzene. The preferred composition comprises 90 parts of SBR 1500 to 10 parts of SBR 1009. However, from 80 to 95 parts SBR 1500 and 5 to 20 parts SBR 1009 may be used if desired.

A small amount of an antioxidant (1 to 2 parts by weight per 100 parts of SBR), such as Flexamine G, may be included in the sealant composition. Flexamine G is a 65/35 blend of a diarylamine-ketone reaction product and a diphenyl-p-phenylenediamine supplied by Uniroyal Inc.

The composition also contains from 5 to 15 parts of a polymerized petroleum resin tackifier per 100 parts of SBR. A suitable resin for this purpose is known as Pentaprene 100 supplied by Chemfax, Inc., of Gulfport, Miss. As in prior puncture sealant compositions, commercial grades of black iron oxide are employed in order to provide the desired stiffness to the material while retaining the required tackiness. Sixty to 75 parts of commercial black iron oxide per 100 parts of polymer are used. In order to provide a composition of the desired viscosity, suitable noncuring plasticizers are included. A particularly desirable combination of plasticizers consists of from 10 to 20 parts by weight of Atlantic Plasticizer No. 2, a petroleum plasticizer supplied by the Atlantic Refining Co., to each 100 parts of rubber plus from 2 to 10 parts of a paraffinic oil known as Flexon 840 supplied by The Humble Oil Co. The petroleum plasticizer, which must be heated to 150° F. so that it can be poured, and Flexon 840 oil are preblended before being added to the rest of the mix. Accelerators and curing agents (such as sulfur) in small quantities of from 0.2 to 1 part of each to 100 parts of SBR rubber may also be added to the sealant compound. The accelerator for example may be a product known as ALTAX which is supplied by the R. T. Vanderbilt Co. However, in the sealing strip 18 shown in the accompanying drawing which is confined or sandwiched between the carcass body plies 12 of the tire and the inner liner 16, it is possible to eliminate the accelerators and curing agents entirely. It is also desirable to include a retarder such as salicylic acid, boric acid or diphenylnitroso-amine.

A typical recipe for a low-cure, puncture-sealing composition in accordance with the present invention is as follows:

| Ingredients | Parts by Weight | |
|---|---|---|
| Cold synthetic rubber (SBR 1500) | 90 | |
| Hot synthetic rubber (SBR 1009) | 10 | |
| Black iron oxide | 61 | Tackifier (Pentaprene 100) 8 |
| Zinc oxide | 3 | |
| Antoxidant (Flexamine G) | 1 | |
| Petroleum plasticizer (Atlantic Plastizier No. 2) | 15 | |

Paraffinic oil (Flexon 840)   3.75
Benzothiazyl disulfide (ALTAX)   0.50
Retarder   0.62
Sulfur   0.25

The foregoing puncture sealant composition may be used in both sealant layers 18 and 20 with good results. However in the sandwich layer 18, the curatives may be eliminated entirely in order to further retard curing of the sealing material during use of the tire.

The puncture sealant composition as described above is processed in the usual manner into sheets of the desired dimensions in which the thickness is preferably not in excess of 0.120 inch. A sheet of sealant material is first placed directly on the tire building drum, which is desirably recessed in the center to receive the layer of sealant. The usual inner liner is then placed over this first sheet of sealant, and another sheet of sealant material is placed over the inner liner. The usual carcass plies, beads, tread and sidewalls strips, as well as other materials to be used, are then applied in order to complete the building of the green tire which is later cured in a tire mold in accordance with conventional practice.

Results of severe puncture tests have shown that puncture sealant tries incorporating this construction are considerably superior to tires with single layers of sealant insofar as their puncture sealing performance is concerned while maintaining as good or better durability and balance. Furthermore, by reducing the acceleration in the cure of the puncture sealant composition, the tendency for the sealant to pick up too much cure from the migration of curing substances into it from the adjacent layers of stock while the tire is in use, is reduced to the point where it is at least as good as or better in this respect than the prior sandwich-type multilayer constructions referred to hereinbefore. In addition, since the materials used in prior sandwich-type sealant constructions are comparatively costly, the present sealant composition and arrangement with the inner liner is less expensive to manufacture due to the fact that no covering strips are used and the existing inner liner acts as a separating strip between the layers of sealant.

I claim:

1. In a self-sealing tubeless pneumatic tire comprising a hollow casing of fabric-reinforced, cured, rubberlike, elastic material and having a circumferential thread disposed along its crown area, opposite sidewalls extending radially inward therefrom with inextensible bead rings at the inner edges of said sidewalls and an inner liner of cured, rubberlike material which is impermeable to air and extends from bead to bead along the entire inner surface thereof; the combination therewith of a first layer of puncture sealing material disposed circumferentially along said crown area between said fabric-reinforced material and said inner liner and a second layer of puncture sealing material disposed inwardly of said inner liner circumferentially along the crown area of said tire, said first layer of sealing material in the green tire being devoid of rubber curatives, while said second layer of sealing material contains a sufficient amount of such curatives to increase the viscosity of the material in said second layer enough to prevent is from flowing during normal use of the tire to such an extent that the tire would become unbalanced, each said sealant layers being not in excess of 0.120 inch in thickness.

2. The combination defined in claim 1, wherein said puncture sealing material comprises styrene butadiene rubber and the curative in such sealing material in said second layer comprises from 0.2 to 1 parts by weight sulfur per 100 parts of said rubber.